United States Patent [19]

Kite

[11] 4,389,173
[45] Jun. 21, 1983

[54] ARCUATE PISTON ROTARY ENGINE

[75] Inventor: William C. Kite, Kelseyville, Calif.

[73] Assignee: Earl J. Lee, El Cajon, Calif.

[21] Appl. No.: 364,286

[22] Filed: Apr. 1, 1982

[51] Int. Cl.³ .................. F01C 1/00; F01C 19/00; F02B 53/00
[52] U.S. Cl. .................. 418/146; 123/206; 418/260
[58] Field of Search .............. 123/206, 210, 243; 418/142, 146, 260, 263, 266

[56] References Cited

U.S. PATENT DOCUMENTS

| | | | |
|---|---|---|---|
| 39,832 | 9/1863 | Platt | 418/263 |
| 643,432 | 2/1900 | Washington et al. | 418/260 |
| 781,342 | 1/1905 | Hoffman | 418/260 X |
| 805,163 | 11/1905 | Smith | 418/263 |
| 975,275 | 11/1910 | Perlewitz | 418/263 X |
| 1,307,631 | 6/1919 | Jacques | 418/260 X |
| 1,324,260 | 12/1919 | Meyer | 418/263 X |
| 2,298,525 | 10/1942 | Briggs | 123/243 X |
| 2,345,561 | 4/1944 | Allen | 418/137 X |
| 3,762,375 | 10/1973 | Bentley | 123/243 |
| 4,137,891 | 2/1979 | Dalrymple | 123/206 X |

FOREIGN PATENT DOCUMENTS 1224093 9/1966 Fed. Rep. of Germany ...... 123/210
7826 4/1899 Norway ........................... 418/266

Primary Examiner—Michael Koczo
Attorney, Agent, or Firm—Ralph S. Branscomb

[57] ABSTRACT

A rotary engine is provided utilizing a non-cylindrical casing which defines lobes on opposite sides which define crescent-shaped intake and combustion chambers, respectively, these chambers being connected by a narrow corridor on both sides of a central rotor which rotates on an axis coaxial with that of the casing. The rotor includes arcuate blades which move in and out of the rotor wall to wipe the non-cylindrical casing wall, these blades or pistons being urged outwardly by a special spring loaded cam follower which follows a dual cam which is non-rotational relative to the engine casing. In the preferred mode of operation, one of the crescent-shaped chambers acts as the intake and compression chamber, with the second chamber acting as the combustion and exhaust chamber by virtue of the positioning of intake and exhaust ports and a specialized automatically operated pressure driven fuel injector which is used when the engine is operated as a diesel.

1 Claim, 32 Drawing Figures

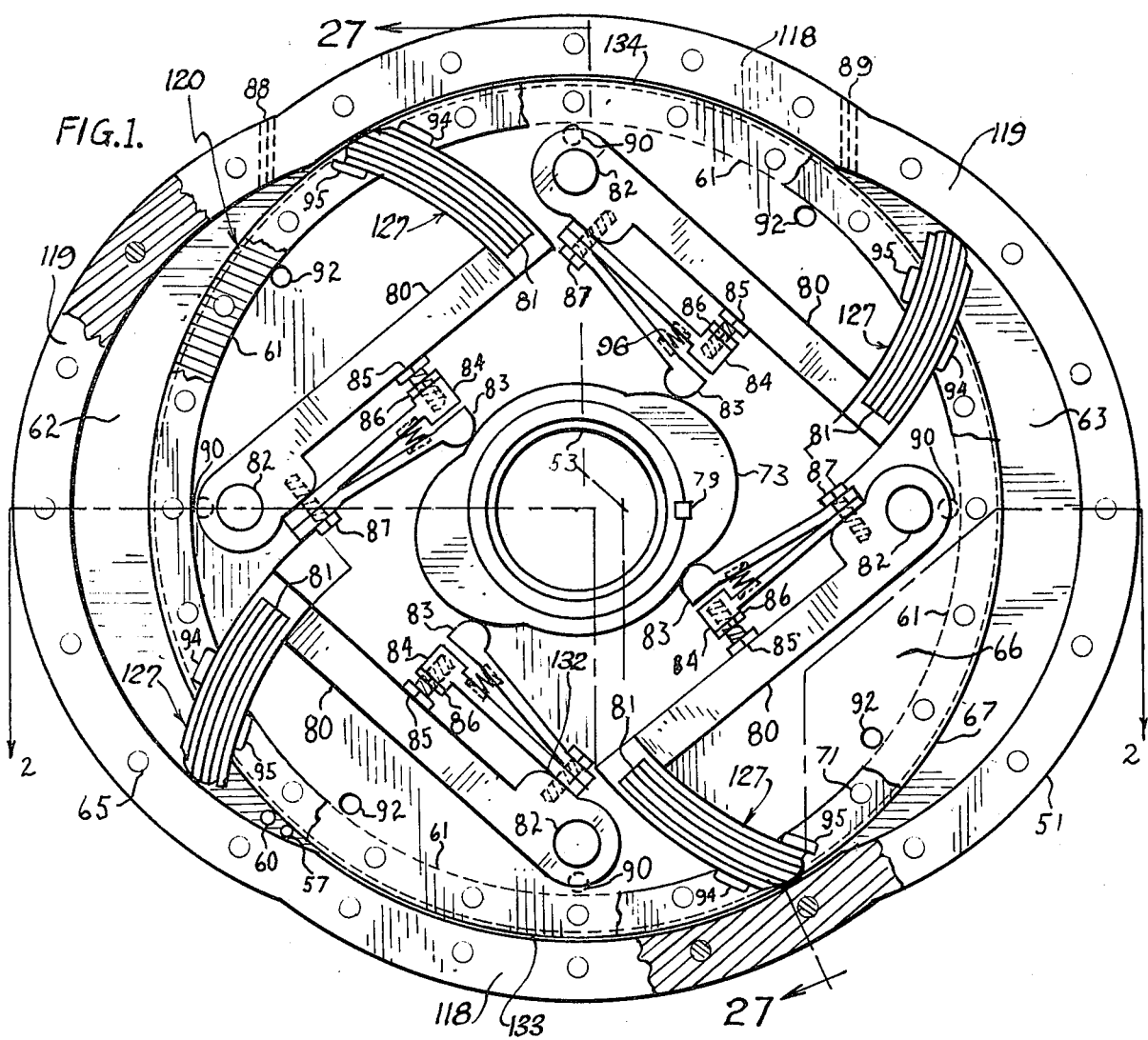
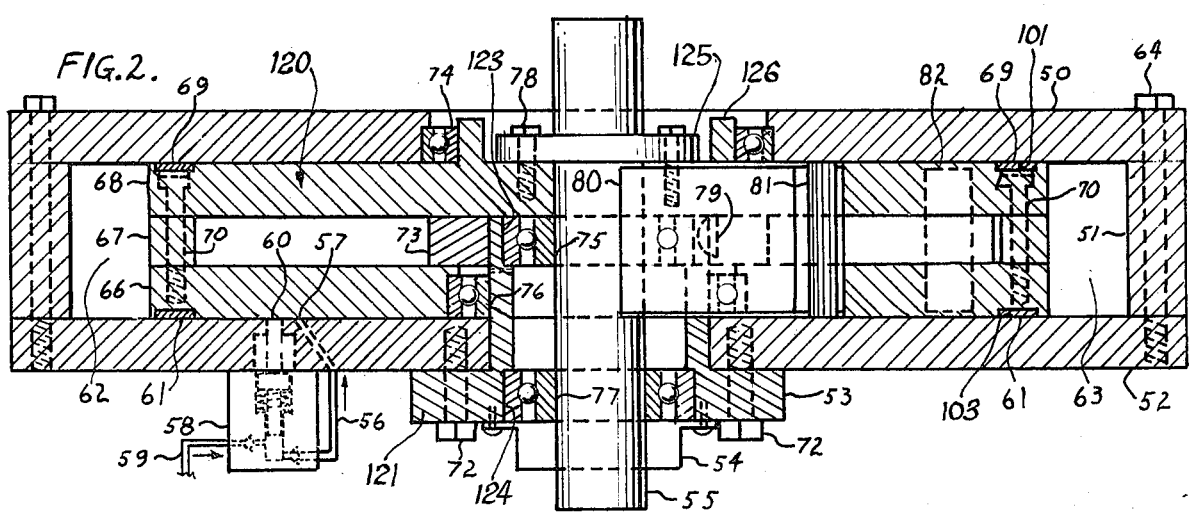

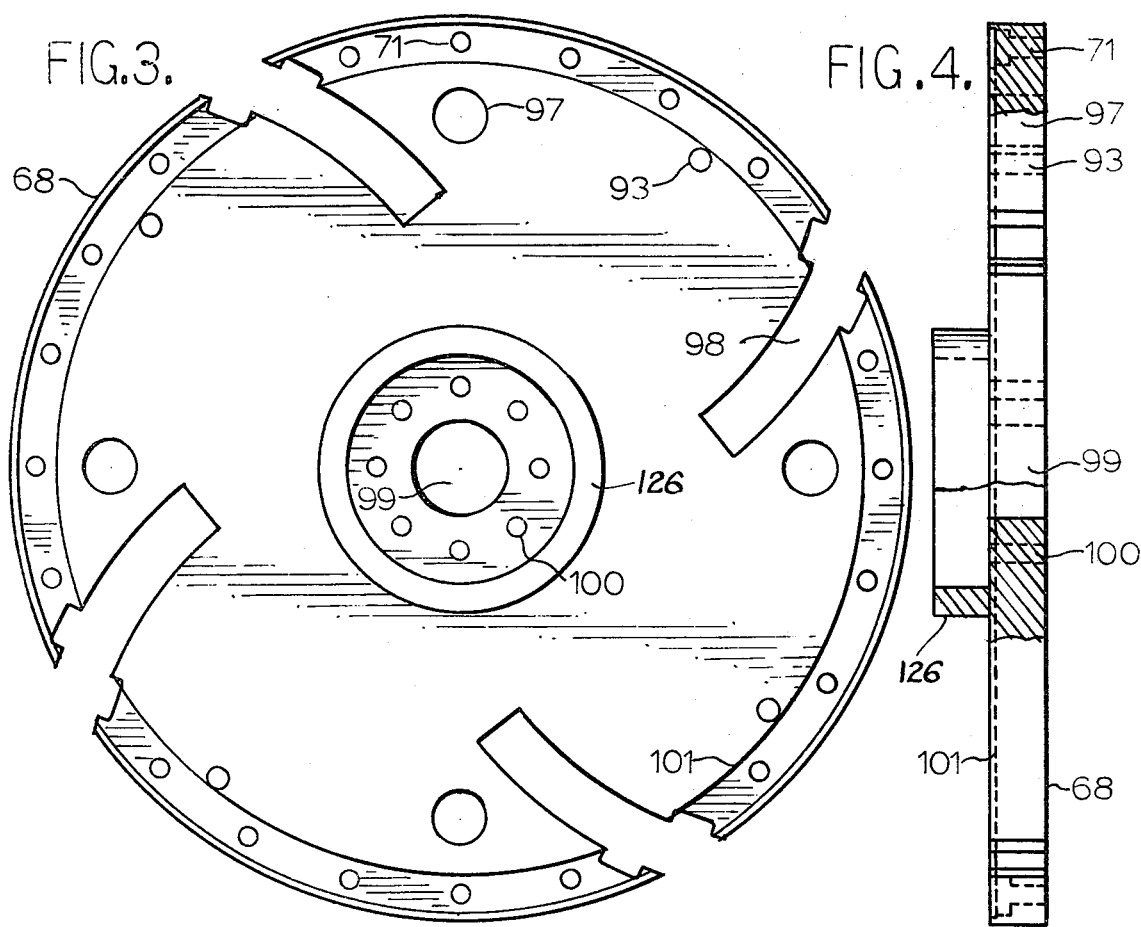
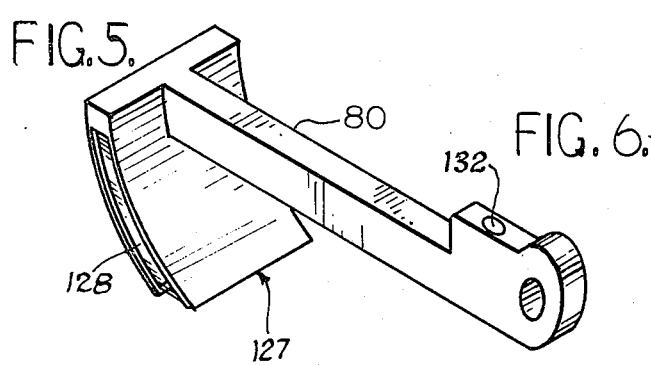

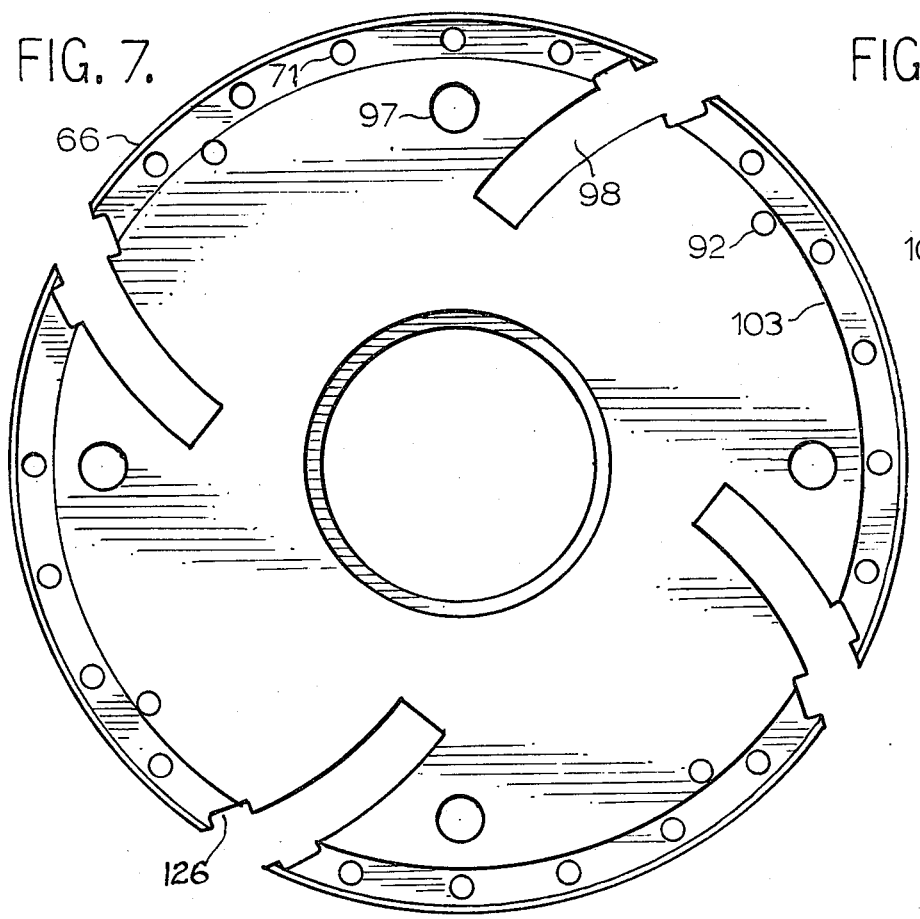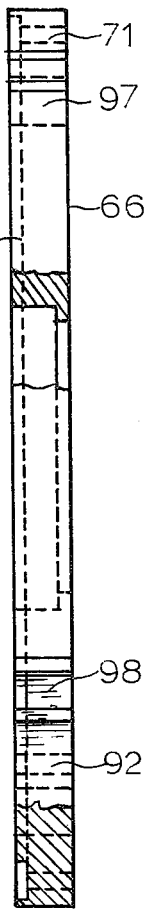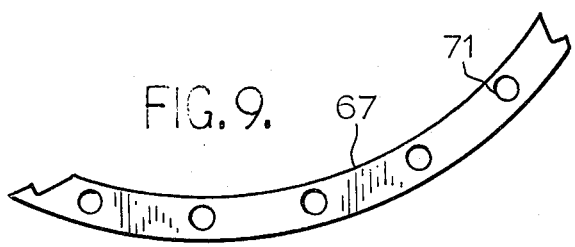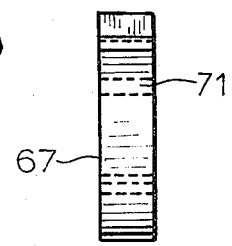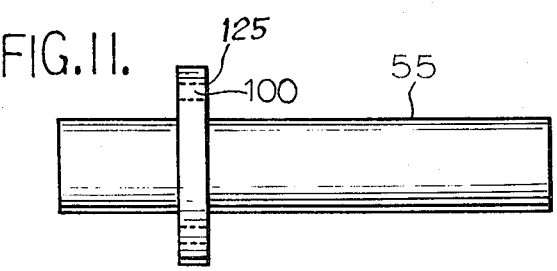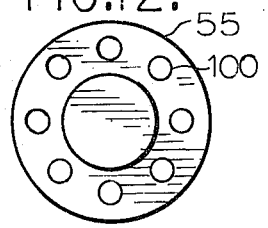

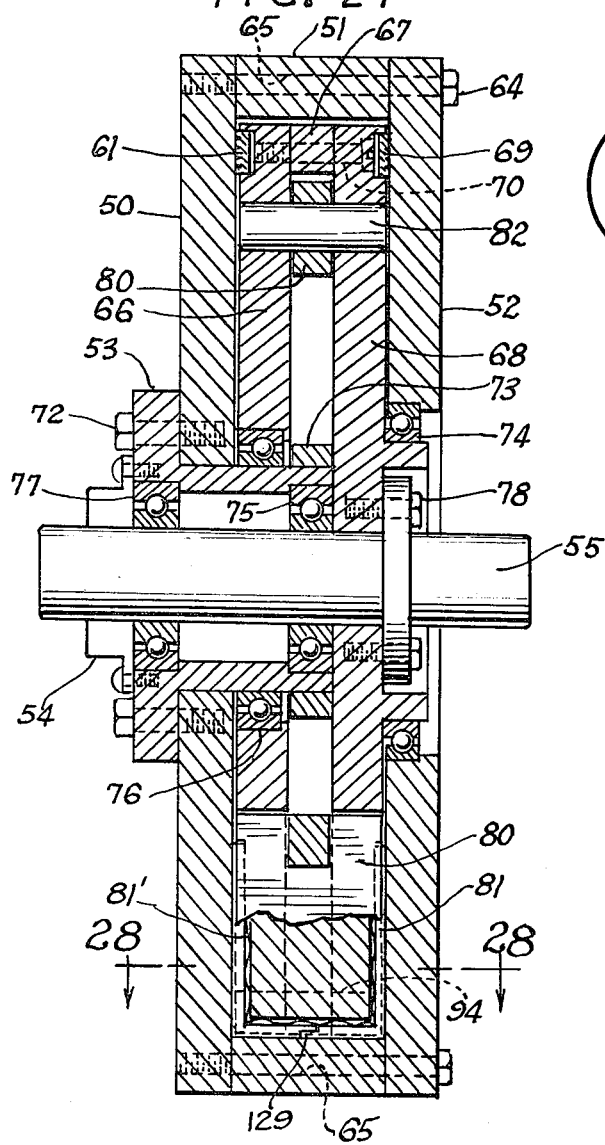
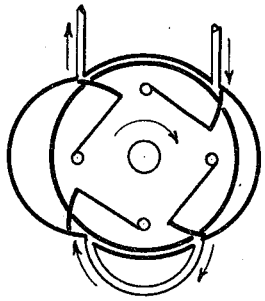
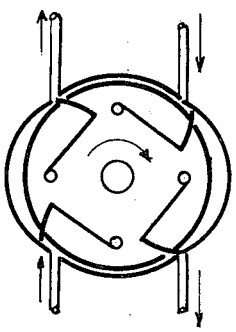
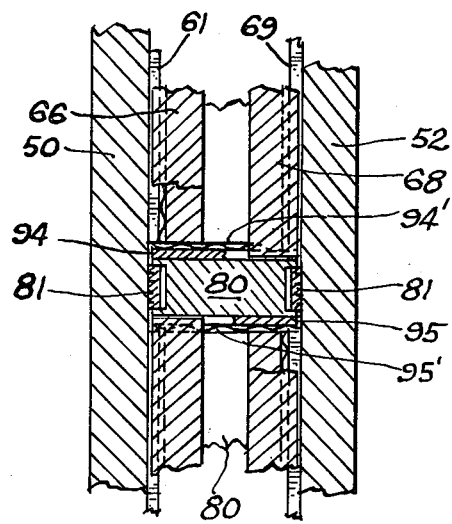
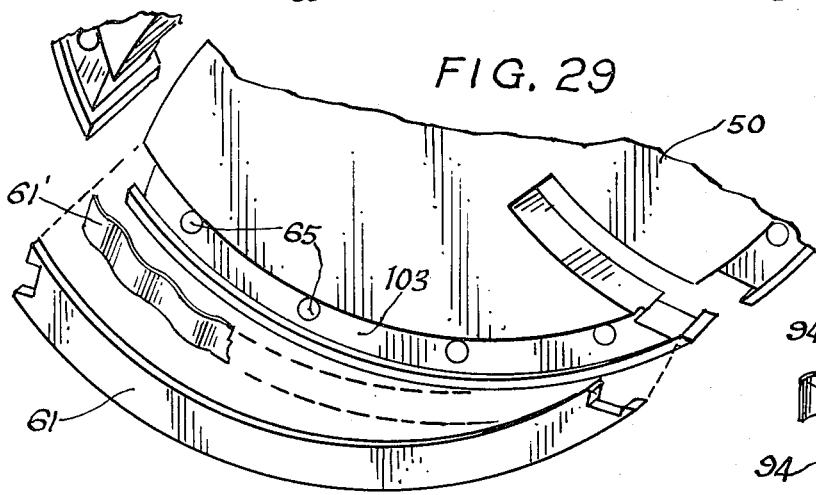
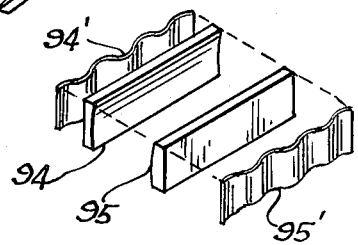

ARCUATE PISTON ROTARY ENGINE

BACKGROUND OF THE INVENTION

The inherent drawbacks of reciprocating piston engines have long been known and hundreds if not thousands of efforts have been made to create rotary engines which deliver power from combustion or pressurized gas more directly in a rotary direction rather than into a reciprocating system which must then be converted into rotation by an eccentric.

The best known rotary engine is of course the Wankel machine, which utilizes a rotor which is pushed against a revolving eccentric which in turn through the utilization of the wedge principle, converts an angular force into a rotational force.

Other engines have been developed along the lines of the instant invention in which a central rotary cylinder moves either in a non-cylindrical casing, or in a cylindrical casing but as eccentric of the axis of the casing. Examples of this type of engine are shown in U.S. Pat. Nos. 3,437,079 and 3,955,540 both of which utilize a cylindrical rotor mounted eccentrically in a cylindrical cylinder, and U.S. Pat. No. 4,134,382 which utilizes a non-cylindrical rotor in an oblate casing.

This general type of rotary engine has the principal advantage that the force of expansion of the combustion gases is applied more directly in a rotary motion due to the generally radially extending blades which act as a pistons, than do most rotary engines, and certainly more than reciprocating engines. There is also an inherent simplicity in the valving function, which can generally be provided automatically as a function of the rotary cylinder or blades passing over open ducts so that the motion of the rotor or the blades themselves accomplish the valving function. One problem with this type of engine, however, is the wear of the bearing tips of the piston blades which wipe the interior of the casing surface, and which are difficult to lubricate in some manifestations of the blade piston concept. Due to the general flatness of the engine, however, they are relatively easy to stack so that even in the one cycle version, any number of units can be ganged out of phase to achieve a smooth rotary motion on a common shaft.

SUMMARY OF THE INVENTION

The present invention is a blade-type rotary engine of the basic type mentioned above, but sets forth a number of improvements on this type of rotary action. In the preferred embodiment, the engine is of the two-chamber type, having two crescent-shaped chambers on opposite sides of a central rotor with the crescent-shaped chambers being connected at both pairs of apices with thin corridors, so that with the piston blades out of the way, there is a continuous communication completely around the central rotor.

Rather than utilizing straight blade pistons, the instant invention incorporates dual advantages inherent in not only slanted but arcuate blade pistons which are mounted on the end of lever arms pivotal between the two side plates which define the rotor. An adjustable spring bias means incorporated on each lever arm includes cam follower structure which rides on a central double-lobed cam which is fixed with respect to the engine casing and causes a uniform force to be applied at the tip of the blade piston to the inside of the non-circular casing sidewall as the rotor rotates. Each of these cam following spring mechanisms has an adjustable set screw.

In the diesel embodiment which is that principly disclosed, intake, exhaust, and also diesel fuel injection is achieved exclusively by means of pressure variations effected by rotation of the piston blades in the non-circular casing. As will become more apparent from the detailed description, a simple air hole provided in the upstream and downstream ends of the first and second crescent chamber, respectively, permits air intake and exhaust, and a simple double piston pump is activated by the high pressure of the compressed gases in the combustion chamber to actually squirt a charge of diesel fuel through the injector jet into the combustion chamber.

Other advances and advantages will become apparent from a closer examination of the detailed description provided below.

BRIEF DESCRIPTION OF THE DRAWINGS

FIG. 1 is an elevation view of the engine with one end plate removed and portions cut away;

FIG. 2 is a section taken along line 2—2 of FIG. 1;

FIG. 3 is a plan view of the outside of the rear rotor plate 68;

FIG. 4 is an elevation view of the plate of FIG. 3 taken from the right side;

FIG. 5 is a perspective view of a typical blade piston element connected to its pivot arm;

FIG. 6 is an exploded elevation view illustrating the biasing mechanism of the piston;

FIG. 7 is an elevation view of the outside of the front rotor plate 66;

FIG. 8 is an elevation of the plate of FIG. 7 as seen from the right side;

FIG. 9 is a plan view of a typical spacer segment which fits between the two parallel rotor plates 66 and 68;

FIG. 10 is an elevation view of the segment of FIG. 9 taken from the right side;

FIG. 11 is an elevation view of the power shaft of the motor;

FIG. 12 is elevation view of the shaft of FIG. 11 taken from the right side;

FIG. 27 is a section view taken along line 27—27 of FIG. 1;

FIG. 28 is a section taken along line 28—28 of FIG. 27;

FIG. 29 is an exploded perspective view illustrating the ring bearings and their spring biasing structure of the front rotor plate 66; and FIG. 30 illustrates the seals for the leading and trailing edge of the arc piston in exploded perspective.

FIG. 31 is a diagrammatic illustration of a two-stage modification of the motor; and FIG. 32 is a double-sided motor.

DETAILED DESCRIPTION OF THE PREFERRED EMBODIMENT

Figure 13:
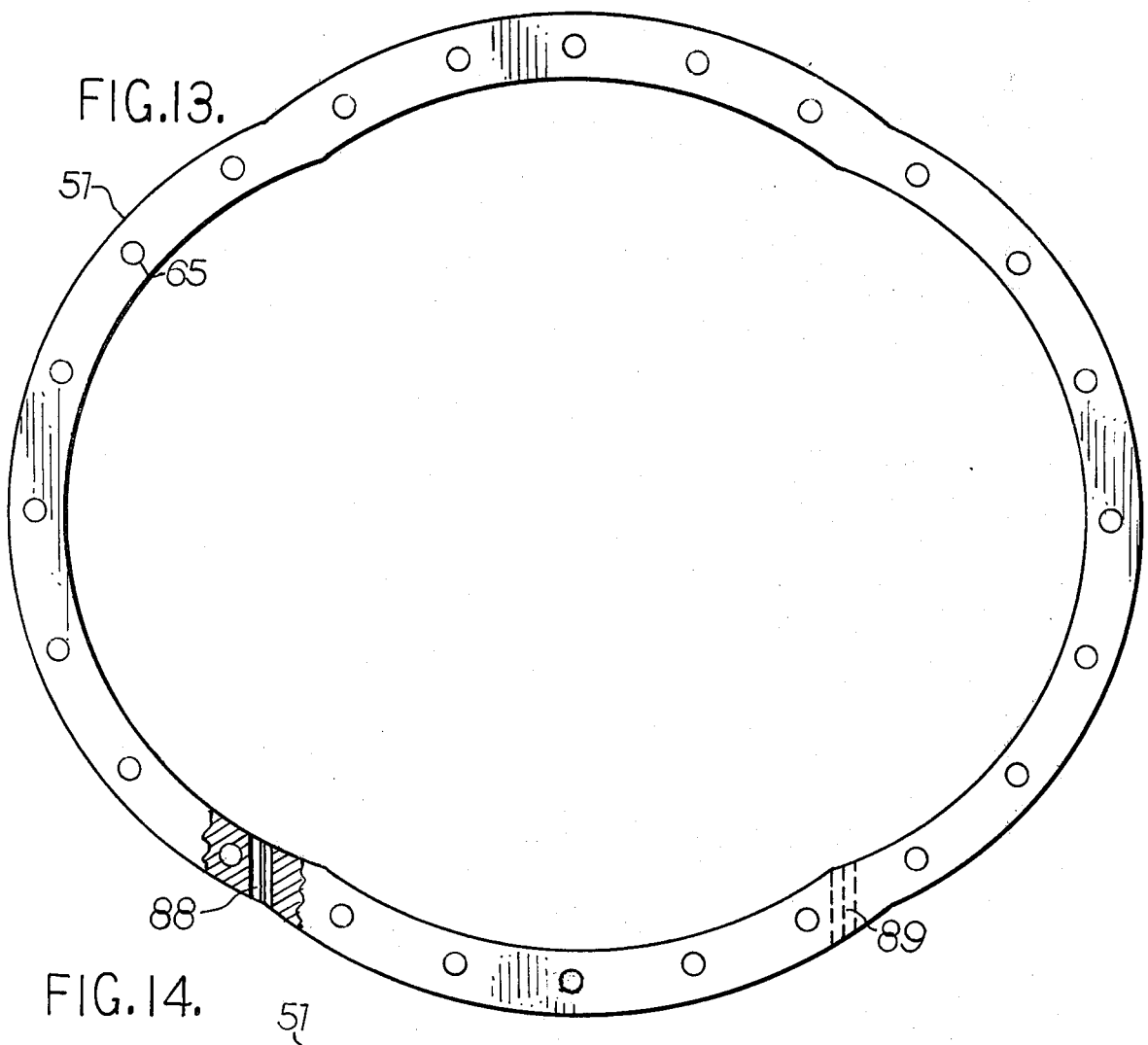
FIG. 13 is a plan view of the casing sidewall.
Figure 14:
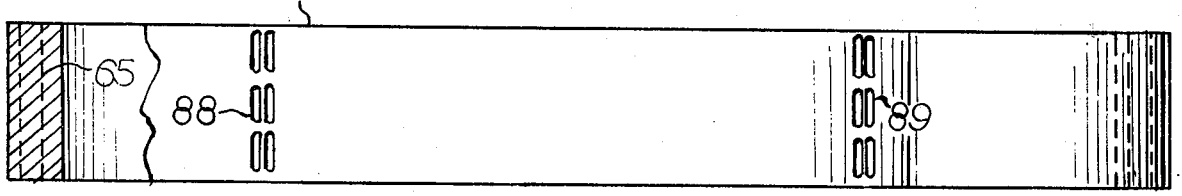
FIG. 14 is an elevation view of the sidewall of FIG. 13 seen from the bottom of that figure.
Figure 15:
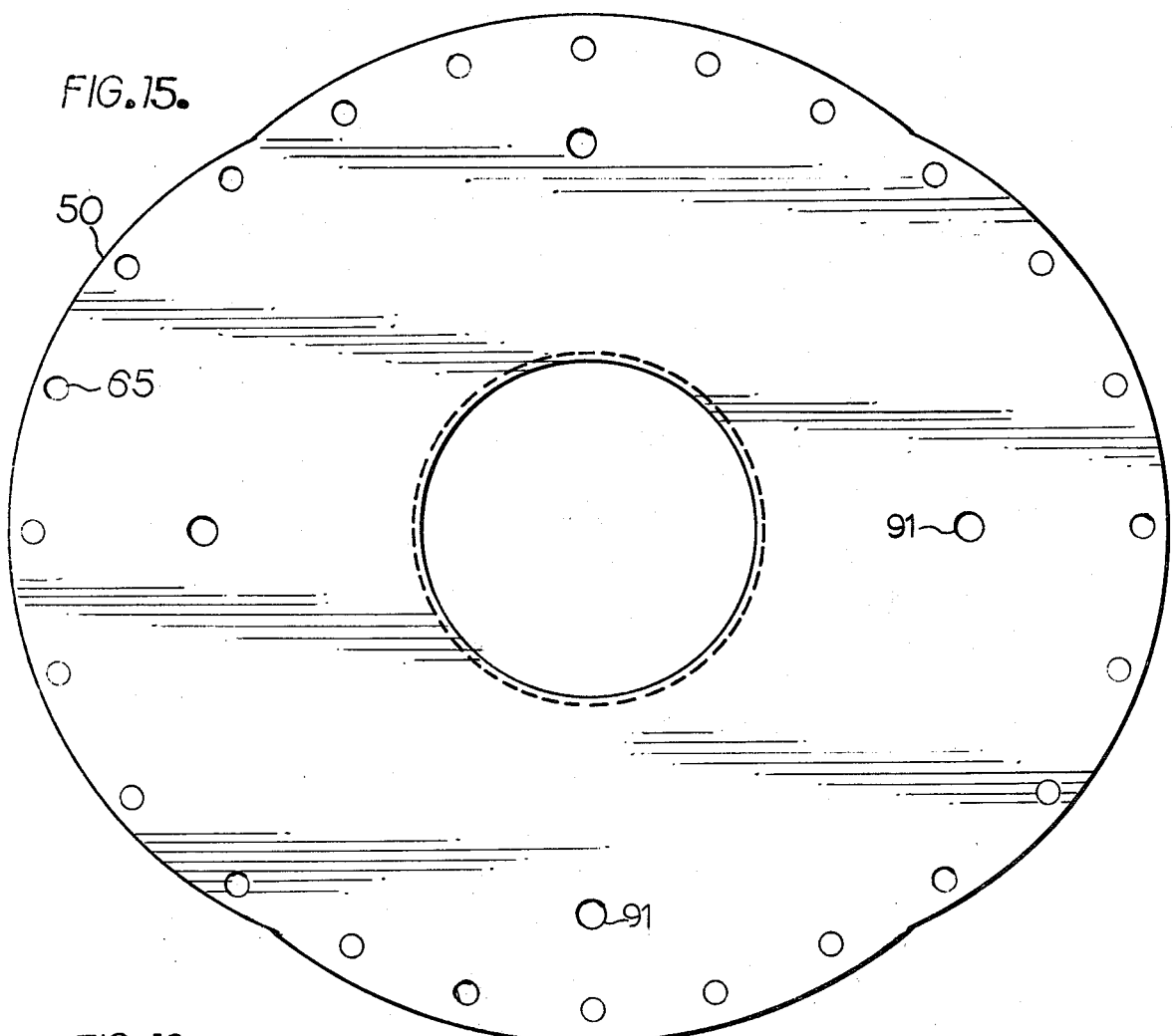
FIG. 15 is a plan view of the rear casing plate.
Figure 16:
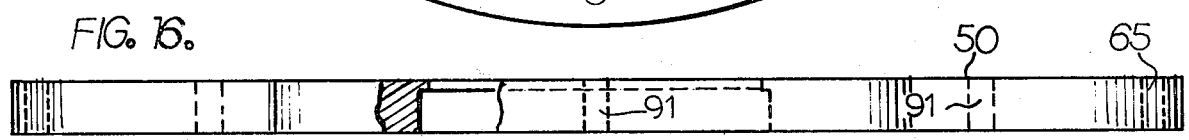
FIG. 16 is an elevation view of the plate of FIG. 15 as seen from the lower side of that figure.

The engine casing is formed by rear and front casing end walls 50 and 52 which sandwich between them the perimeter sidewall 51. These elements can be seen in FIGS. 1 and 2 and are shown in detail in FIGS. 13-16 and 19-20. All of them are generally oblate in plan form, defining cylindrical sectors 18 which define an axis coincident with that of the rotor described below, and a pair of end lobes 19 which are illustrated as being segments of a circular cylinder with the axis being offset from that of the rotor axis. The intersection of the cylinders defined by the lobes and the top and bottom sectors are illustrated in the drawings as being rather sharp, although these would be considerably smoothed to permit smooth travel of the blade pistons. Bolts 64 clamp the casing together through aligned bores 65 rather closely spaced around the perimeters of the end walls and through the perimeter sidewall 51.

Figure 17:
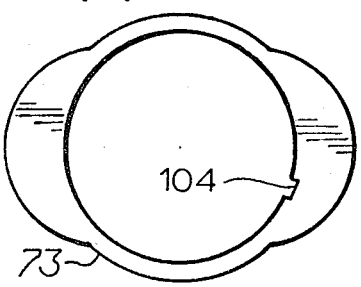
FIG. 17 is a plan view of the cam structure.
Figure 18:
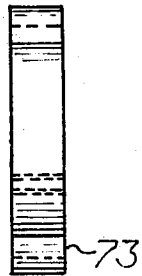
FIG. 18 is an elevation view of the cam of FIG. 17 as seen from the right side.
Figure 19:
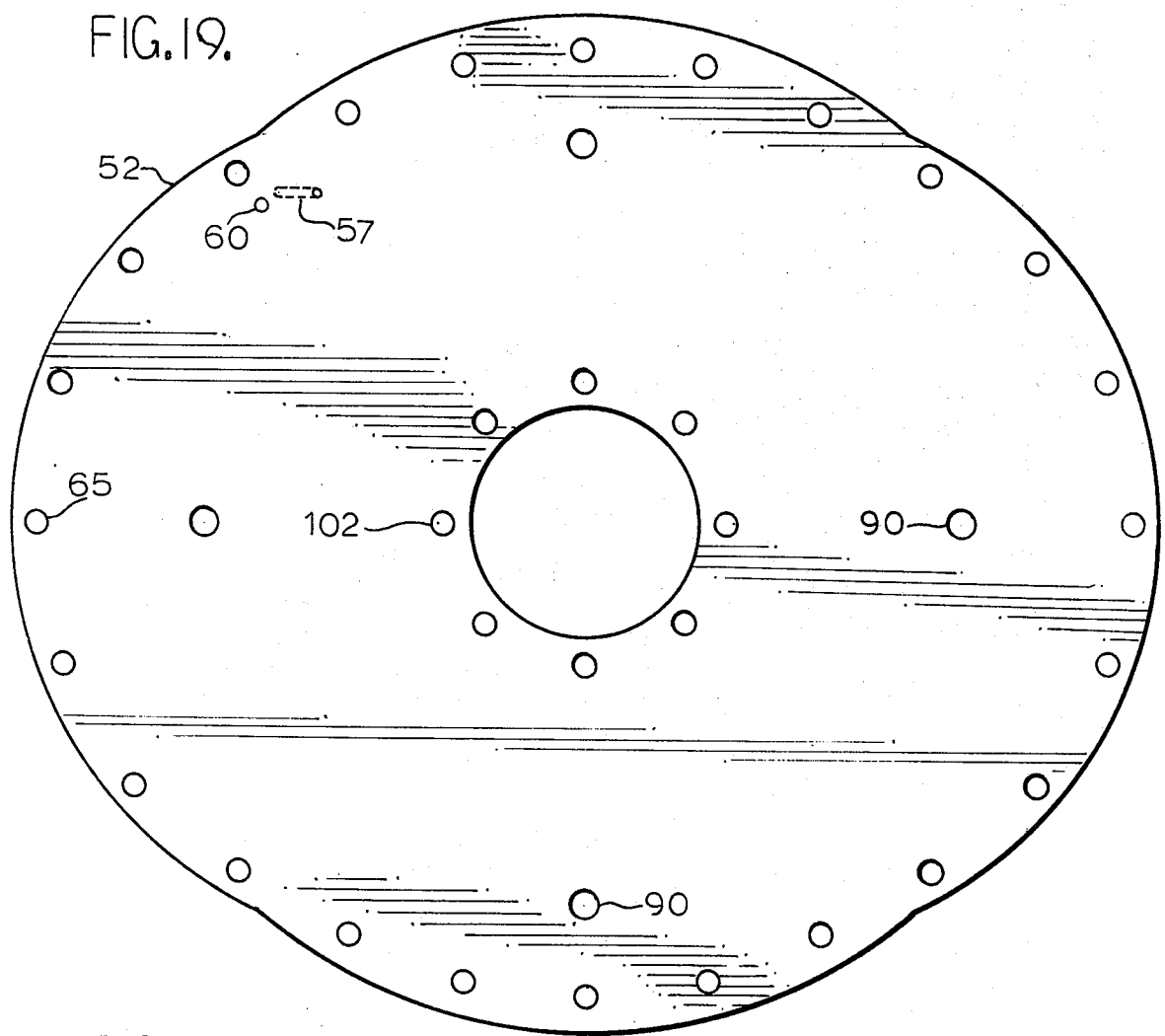
FIG. 19 is an elevation view of the front casing plate similar to the rear casing plate of FIG. 15.
Figure 20:
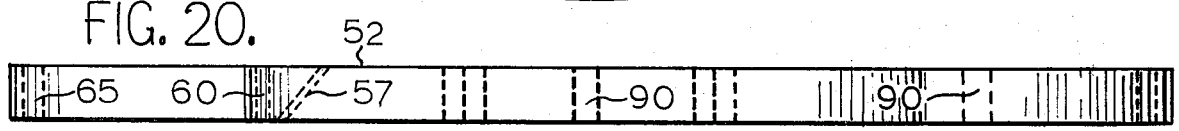
FIG. 20 is an elevation view of the plate of FIG. 19 as seen from the bottom edge in that figure.
Figure 21:
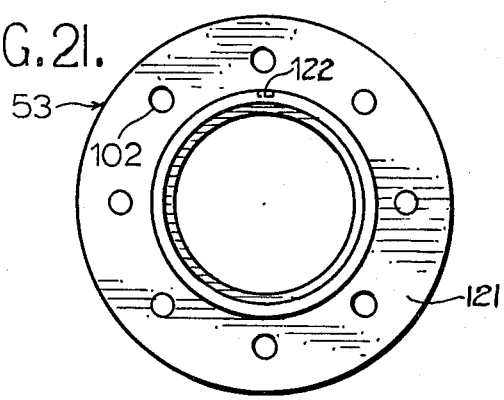
FIG. 21 is an end view of the cam mounting sleeve.
Figure 22:
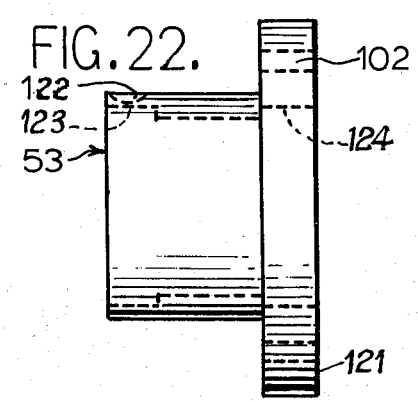
FIG. 22 is a side elevation view of the cam mounting sleeve shown in FIG. 21.

Insofar as they relate to the casing, interiorly of the casing there are two basic structures, a cylindrical rotor 120 which rotates about an axis that is central to the casing, and a central cam structure 73 which is stationary relative to the casing and is mounted thereto. The manner in which the cam is rigidly attached to the casing and the rotor is freely rotatable therein is best understood by initial reference to a mounting sleeve 53 which has a collar 121 through which occur a series of spaced mounting bores 102 through which bolts 72 mount the sleeve to the front end wall 52 of the casing as can be seen in FIG. 2. This sleeve together with its mounting flange provides a hollow, rigid sleeve structure internally of the casing, and on this sleeve structure is mounted the cam 73 which is illustrated in isolation in FIGS. 17 and 18. The cam has a keyway 104 which corresponds to keyway 122 in the sleeve, so that the two are non-rotationally joined with a key 79. Other than the sleeve and the cam, all of the structure inside the casing rotates.

The rotary power shaft 55 is journalled within the sleeve on bearings 75 and 77 which are seated in recesses 123 and 124 defined on the inside of the sleeve. The shaft has a falange 125 toward the rear, and bolts 78 mount rear rotor plate 68 to this flange. The rear rotor plate has an upright collar 126 which provides the rotor with additional support by riding on bearings 74 seated in a recess in the rear endwall 50 of the casing. The front endwall 52 also has a recess which seats bearing ring 76 mounted on the exterior surface of the sleeve 53, and an oil pump housing and seal assembly is mounted around the shaft 54.

The rotor itself is comprised of the above mentioned end plates and a series of four perimeter spacers or segments 67 shown in FIGS. 9 and 10. These spacer segments extend between each pair of piston slots in the rotor plates. The rotor is held together by a series of closely spaced bolts 70 passing through bolt holes 71 in both the rotor plates and the segments 67. The bolts are countersunk so that their heads do not obstruct the front and rear seal grooves 103 and 101. These grooves seat seals 61 and 69, respectively, each of which is provided in four segments as can best be visualized by reference to FIG. 29, and each seal segment has a profile very similar to peripheral rotor spacer segments 67, for obvious reasons.

The rotor in its entirety provides four piston clearance slots 98 which pass completely through the rotor, including the side plates, spacer segments 67 and segmented seals 61 and 69. All of these elements also provide lateral slots 126, which are actually composite slots passing through the entire rotor sandwich and house piston leading and trailing edge seals 94 and 95, respectively. These seals, as well as the case-to-rotor seals 61 and 69, are each biased outwardly by their respective corrugated leaf springs identified by the number of their respective seals, primed. This structure should be clear by reference to FIG. 29. Clearly the leading and trailing edge seals 94 and 95 would pop out of place were the slots 126 not occupied with arcuate piston blades described below.

Both of the rotor side plates are provided with corresponding bores 97 which mount piston pins 82 best seen in FIGS. 1 and 2. These pins mount the pivot arms 80 which are freely pivotal on these pins, with the ends of the pivot arms being an integral part of the actual arcuate blade pistons 127. Each piston is provided with a peripheral channel 128 which houses a U-shaped piston "ring" 81, which has an overlapping rabbet joint 129 and is urged outwardly in all directions by corrugated leaf spring 130. A review of the bearing structure of the rotor and the relation of the rotor to the casing will reveal that the piston ring bears directly on the engine casing end walls and the outer sidewall, and the piston itself is sealed around all of its edges that are extended beyond the circumference of the rotor by virtue of seals 94 and 95 and by the pistons' own rings. These rings are provided with oil grooves which make certain of the figures, notably FIG. 1, appear as though they were a number of rings or that the piston is of laminated construction.

The piston is biased outwardly by means of a cam follower 83 which rides on the surface of the bi-lobed cam 73. The cam follower is made of a spring steel and is bolted into the pivot arm at 132 so that without any additional structure, outwardly biasing pressure would be applied to the piston as the follower rotates around the stationary cams. The shape of the cam and the position of the cams relative to the lobes 119 of the casing are such that an even pressure is applied by the wiper portion of the piston ring against the sidewall of the casing regardless of how far out the blade piston extends.

Although ideally the cam is perfectly shaped and oriented no springiness in the cam follower would be required at all, due to design and manufacturing defects as well as inevitable engine wear, springiness is incorporated not only into the cam follower 83, but also into the auxiliary spring arm 84 which captures auxiliary spring 96 between itself and the follower 83. In addition, the auxiliary spring compression is adjustable by virtue of adjusting bolt 85 secured in position by the lock nut 86.

OPERATION

Operation of a unit occurs in the following fashion. Each set of adjacent piston blades together define a zone which is completely sealed. Each of these zones passes through various sectors of the engine in exactly the same fashion as every other zone formed by every other adjacent pair of pistons, so that at all times are four zones, each separated in its cycle from adjoining zones by 90°.

As a typical zone moves through the top dead center of the interior cavity of the casing in its orientation of FIG. 1, the leading piston passes the intake ports 89 and brings the zone into communication with this intake port. Thereafter, the zone moves into the crescent-shaped intake/compression chamber 63 where it gets larger and larger until the zone is 90° advanced from top dead center, in other words it is centered in the chamber 63. At this point, the trailing piston blade passes the intake port 89, sealing the zone off from external air.

As the zone moves further, it is compressed as it moves into the smaller and smaller portions of the chamber 63. Finally, the leading piston exits the chamber 63 and moves into a region characterized by a very narrow corridor 133 which exists by virtue of the rotor being slightly shorter in radius than the sectors 118 of the casing. The zone moves increasingly into this corridor until it is completely compressed in this very narrow space, representing a compression ideally of more than 20 to 1.

Very shortly after the leading piston of the zone exits the corridor 133 it crosses fuel injection port 57, and subsequently aperture 60. At this point, the intense pressure within the zone immediately drives downwardly a spring-returned larger piston in the pneumatic fuel injector assembly 58, with the larger piston driving a smaller piston operating between check valves disposed respectively on the fuel intake line 59 and in the injector nozzle supplied to 56, causing a forceful injection of a pre-determined quantity of diesel fuel into the zone as it enters the crescent-shaped ignition/combustion chamber 62. At this point a couple of things should be noted. First, because the pistons are moving full speed in the direction of rotation, the shock of ignition is greatly reduced from the experienced by a reciprocating piston which is caught top dead center by explosion. The arcuate shape of the piston also lessens lateral loads on the bearings.

Continuing with the cycle, the zone in which combustion just occured passes further in its expansion cycle into the chamber 62 until maximum volume is reached, shortly after which the leading piston passes the exhaust port 88, driving out the combustion products and eliminating all gas in the end except for the small amount capable of occupying the upper corridor 134. This corridor could actually be smaller than the lower corridor 133, which must house compressed air ready for combustion.

Although the lubrication system of the engine will not be detailed herein, it includes an oil pump housing and seal assembly 54 which pumps oil internally of the rotor, and a series of lubricating oil return openings 90, 91, 92 and 93.

Ordinarily a water jacket would have to be provided around the casing. For clarity of disclosure, none has been shown. Also, different fuel types may dictate variations of chamber size to vary the compression ratio. The diesel embodiment shown has a ratio that is too high for a gasoline engine.

There are a number of alternative modes of operation of the engine, basically as described above. Clearly, rather than operating the unit as a diesel, the ignition chamber 62 could be provided with a spark plug where the ports 60 and 57 are in the diesel embodiment, and a carburated mixture fed into the intake port 89. A pressure-activated switch could be operated by the pressure in the combustion/ignition area, or elsewhere where a pressure change corresponds phase-wise with the ignition area.

Additionally, as indicated in FIG. 31, the casing and cam structure could be modified so that the intake/compression chamber is much smaller that the combustion/exhaust chamber. In this embodiment, the engine is not actually used as an internal combustion engine, but cycles compressed gas such as steam first through the chamber 63' where it expands from its initial high pressure to a pressure still higher than atmospheric, and then cycles through connector line where it drops to atmospheric pressure, so that a two-stage system is created.

Additionally, in FIG. 32, a straight double-sided compressed gas motor is shown wherein each of the crescent-shaped chambers is identically utilized. This embodiment could also be adapted for use as a hydraulic motor. The same unit, by rotating the shaft by an external source, could be used as a hydraulic pump. The shaft would best be reversed in the pump mode from the direction in which it travels in the motor mode.

Turning to a modification of the invention illustrated in FIGS. 23-26, in this modification, which is diagramatically illustrated, all principles of operation remain the same except that a straight blade piston system is used rather than the arcuate blade shown in FIG. 5. In this embodiment, rotor 105 moves around the stationary cam 106 while the pistons 107 are held out by cam follower 113 engaged in the cam follower guide 111 and locked at the desired extension with cam follower adjusting locknut 112. A bored opening 114 seats the cam follower guide and between the bottom of the bore and the guide a compression spring 110 is captured. Other numbered details include rotor-to-case seal 116, piston "ring" 117, lubrication oil return holes 108, and the piston leading and trailing edge seals 109.

Figure 23:
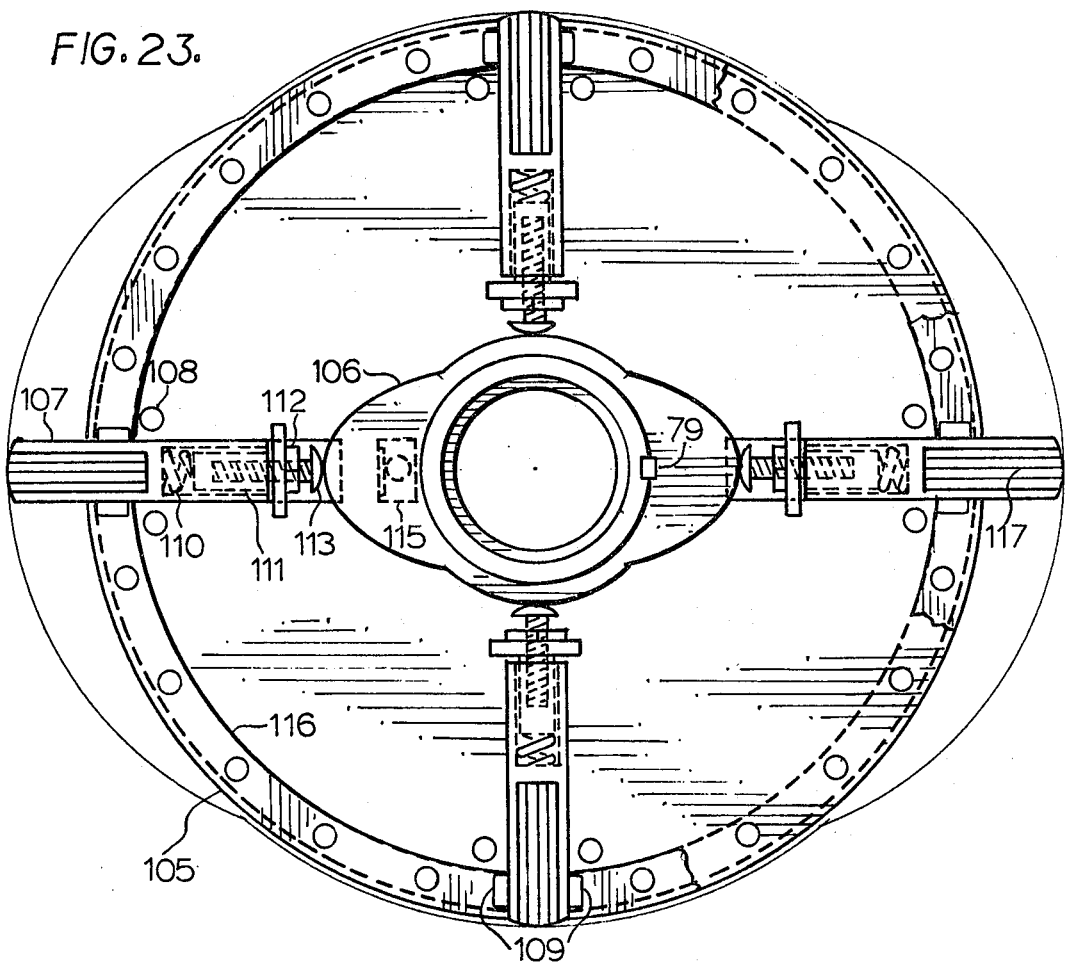
FIG. 23 is a diagramatic illustration of an engine similar to that shown in FIGS. 1-22 but utilizing straight blade pistons and a straight spring biasing apparatus.
Figure 24:
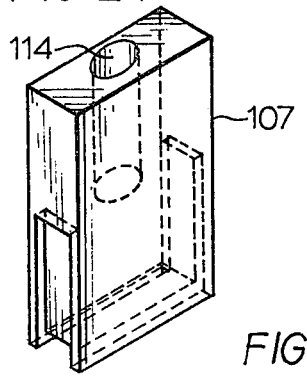
FIG. 24 is a perspective view of portions shown in phantom of the bias spring housing mechanism.
Figure 25:
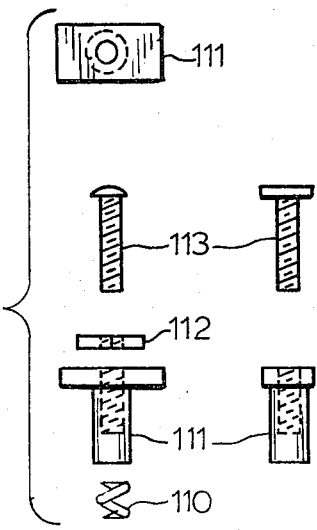
FIG. 25 is an exploded elevation view of the bias spring mechanism illustrated in FIGS. 23 and 24.
Figure 26:
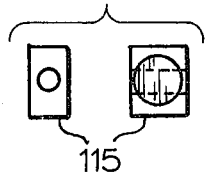
FIG. 26 is a diagramatic illustration of the spring retainer.

In a further slight modification of the principal embodiment of FIG. 23, the cam structure could be deleted and for each piston a single, elongated version of spring 110 could be used captured on its inner end by spring retainer 115 mounted between the rotor plates.

While the preferred embodiment of the invention has been described, other modifications may be made thereto and other embodiments may be devised within the spirit of the invention and scope of the appended claims.

What is claimed is:

1. A rotary internal combustion engine comprising:
   (a) a casing;
   (b) a rotor mounted in said casing;
   (c) said casing having a pair of spaced parallel endwalls perpendicular to the rotor axis and a sidewall at all points parallel to the rotor axis;
   (d) said casing being oblate with end lobes defining first and second internal crescent-shaped chamber sections beyond the perimeter of said rotor, and intermediate narrow corridor-defining sectors passing close by the perimeter of said rotor and effecting communication between said chamber sectors;

(e) a plurality of circumferentially spaced outwardly biased blade pistons generally radially extended from said rotor to wipe said sidewall and defining successive sealed variable-volume gas zones therebetween;

(f) each of said zones operating through successive approximately 90° portions of its cycle to expand by drawing in gas during Phase 1 of its cycle, compressing gas during Phase 2, effecting ignition and combustion during Phase 3, and expelling exhaust gas during Phase 4 as said zones move through successive ones of said sectors;

(h) said blade pistons being arcuate and swinging on pivot arms and each being pivoted at the center of curvature of the respective piston blade;

(i) a dual cam substantially corresponding in shape to said sidewall;

(j) a cam follower extending from each of said piston pivot arms and riding on said cam;

(k) each of said cam followers having an auxiliary arm and extending from the respective piston pivot arm between the respective cam follower and pivot arm and including an adjustable bolt extending from the respective auxiliary arm to bear against the respective pivot arm, and an auxiliary spring captured between each respective auxiliary arm and cam follower such that the respective bolt bears against the respective pivot arm;

(l) said blade pistons having three bearing sides and each of same being channeled to define a composite U-shaped channel, and including a U-shaped seal seated in said channel; and (m) said rotor comprising a pair of spaced circular plates with indexed slots cut into the edges thereof to slideably receive said blade pistons and said plates defining peripheral grooves on the outside thereof slideably seating bearing sealing strips therein to slide along the endwalls of said casing.

* * * * *